(12) United States Patent
Montenegro et al.

(10) Patent No.: US 12,406,214 B2
(45) Date of Patent: Sep. 2, 2025

(54) PROCESS MODELING TECHNIQUES FOR PROVIDING USER-SPECIFIC PROCESS SCHEDULE DATA

(71) Applicant: WELLS FARGO BANK, N.A., San Francisco, CA (US)

(72) Inventors: Dennis E. Montenegro, Concord, CA (US); Sadie S. Salim, Mill Valley, CA (US); Volkmar Scharf-Katz, San Francisco, CA (US); Miriam F. Clark, San Francisco, CA (US); Akhlaq M. Khan, San Ramon, CA (US); Samuel B. Martin, San Francisco, CA (US); Margaret S. Honeycutt, Crockett, CA (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 147 days.

(21) Appl. No.: 18/329,403

(22) Filed: Jun. 5, 2023

(65) Prior Publication Data
US 2024/0403751 A1    Dec. 5, 2024

(51) Int. Cl.
*G06Q 10/0631*        (2023.01)
(52) U.S. Cl.
CPC .......................... *G06Q 10/063112* (2013.01)
(58) Field of Classification Search
CPC ............................................. G06Q 10/063112
See application file for complete search history.

(56) References Cited

U.S. PATENT DOCUMENTS 10,268,974 B2 *   4/2019   Wiig ................. G06Q 10/103
12,094,014 B2 *   9/2024   Clayton ......... G06Q 10/063116
(Continued)

FOREIGN PATENT DOCUMENTS

| CN | 111768166 A | 10/2020 |
|----|-------------|---------|
| JP | 5787733 B2 | 8/2015 |
| KR | 20200084385 A | 7/2020 |

OTHER PUBLICATIONS

"Intelligent Data Stack Automation", Numbers Station, Believed to be published at least as early as Oct. 6, 2022, 5 pages, Available online at: https://www.numbersstation.ai.

(Continued)

*Primary Examiner* — Dylan C White
(74) *Attorney, Agent, or Firm* — Kilpatrick Townsend & Stockton LLP

(57) ABSTRACT

An process analysis computing system receives input data that identifies a subject-matter expert (SME) process, such as an SME process that requires detailed information regarding a very large quantity of information about the SME process. In the process analysis computing system, a scenario selection engine extracts process factors and user factors from the input data. Based on the process factors and user factors, the scenario selection engine determines initial schedule data describing event stages and milestone stages included in the SME process, and also generates user-specific process schedule data based on a modification of the initial schedule data. A user-specific execution engine in the process analysis computing system receives the user-specific process schedule data. Based on a milestone stage dependency in the user-specific process schedule data, the process analysis computing system controls access to a requested resource associated with the SME process.

20 Claims, 5 Drawing Sheets

(56) References Cited

U.S. PATENT DOCUMENTS

| | | | | |
|---|---|---|---|---|
| 2012/0215574 | A1* | 8/2012 | Driessnack | G06Q 10/0639 |
| | | | | 705/7.12 |
| 2013/0173327 | A1 | 7/2013 | Lance et al. | |
| 2016/0132804 | A1* | 5/2016 | Croft | G06Q 10/06313 |
| | | | | 705/7.23 |
| 2017/0316387 | A1* | 11/2017 | Joshi | G06Q 10/00 |
| 2020/0019907 | A1* | 1/2020 | Notani | G06Q 10/063116 |
| 2020/0410424 | A1* | 12/2020 | Bellaish | G05D 1/0094 |
| 2021/0055933 | A1* | 2/2021 | Bulut | G06N 20/10 |
| 2021/0287177 | A1* | 9/2021 | Musialek | G06Q 10/06312 |
| 2023/0153716 | A1* | 5/2023 | Kumar | G06F 18/217 |
| | | | | 705/7.22 |
| 2024/0169295 | A1* | 5/2024 | Mathews | G06Q 10/06393 |
| 2024/0412166 | A1* | 12/2024 | Gilge | G06Q 10/103 |

OTHER PUBLICATIONS

Bach, et al., "Learning the Structure of Generative Models without Labeled Data", Proceedings of Machine Learning Research, Aug. 6, 2017, pp. 273-282, vol. 70, HHS Public Access.

Bach, et al., "Snorkel DryBell: A Case Study in Deploying Weak Supervision at Industrial Scale", Proceedings of the International Conference on Management of Data (SIGMOD), Jun. 3, 2019, 14 pages.

Bringer, et al., "Osprey: Weak Supervision of Imbalanced Extraction Problems without Code", DEEM'30: Proceedings of the 3rd International Workshop on Data Management for End-to-End Machine Learning, Jun. 30, 2019, 11 pages, Amsterdam, Netherlands.

Callahan, et al., "Medical Device Surveillance With Electronic Health Records", NPJ Digital Medicine, Sep. 25, 2019, 10 pages, Scripps Research Translational Institute.

Chen, et al., "Scene Graph Prediction with Limited Labels", International Conference on Computer Vision, Nov. 30, 2019, 13 pages.

Chen, et al., "Slice-based Learning: A Programming Model for Residual Learning in Critical Data Slices", Advances in Neural Information Processing Systems, Dec. 2019, pp. 9392-9402, vol. 32, HHS Public Access.

Chen, et al., "Train and You'll Miss It: Interactive Model Iteration with Weak Supervision and Pre-Trained Embeddings", Machine Learning, Jun. 26, 2020, 41 pages.

Cohen-Wang, et al., "Interactive Programmatic Labeling for Weak Supervision", Workshop at KDD '19, Aug. 4-8, 2019, 5 pages, Anchorage, Alaska.

Dunnmon, et al., "Cross-Modal Data Programming Enables Rapid Medical Machine Learning", Patterns, May 8, 2020, vol. 1, No. 100019, 16 pages.

Ehrenberg, et al., "Data Programming with DDLite: Putting Humans in a Different Part of the Loop", HILDA '16: Proceedings of the Workshop on Human-In-the-Loop Data Analytics, Jun. 26, 2016, 6 pages, San Francisco, California.

Eyuboglu, et al., "Domino: Discovering Systematic Errors with Cross-Modal Embeddings", Published as a conference paper at ICLR 2022, May 21, 2022 , 28 pages.

Fries, et al., "SwellShark: A Generative Model for Biomedical Named Entity Recognition without Labeled Data", Computation and Language, Apr. 20, 2017, 11 pages.

Fries, et al., "Weakly supervised classification of aortic valve malformations using unlabeled cardiac MRI sequences", Nature Communications, Jul. 15, 2019, vol. 10, No. 1, 10 pages.

Fries, et al., "Trove: Ontology-driven weak supervision for medical entity classification", ArXiv, Available online at: https://arxiv.org/pdf/2008.01972v1.pdf, Aug. 5, 2020, 23 pages.

Fries, et al., "Ontology-driven Weak Supervision for Clinical Entity Classification in Electronic Health Records", Nature Communications, Apr. 1, 2021, vol. 12, No. 1, 11 pages.

Fu, et al., "Fast and Three-rious: Speeding Up Weak Supervision with Triplet Methods", ICML'20: Proceedings of the 37th International Conference on Machine Learning, Jul. 15, 2020, 42 pages.

Hancock, et al., "Training Classifiers with Natural Language Explanations", Proceedings of the conference, Association for Computational Linguistics Meeting, Jul. 2018, pp. 1884-1895, HHS Public Access.

Krishnamurthy, et al., "Reference-based Weak Supervision for Answer Sentence Selection using Web Data", Findings of the Association for Computational Linguistics: EMNLP 2021, Apr. 18, 2021, 5 pages.

Kuleshov, et al., "A machine-compiled database of genome-wide association studies", Nature Communications, Jul. 26, 2019, vol. 10, No. 1, 8 pages.

Mallinar, et al., "Bootstrapping Conversational Agents With Weak Supervision", The Thirty-First AAAI Conference on Innovative Application of Artificial Intelligence, Jul. 17, 2019, 6 pages, Available online at: https://doi.org/10.1609/aaai.v33i01.33019528, PKP Publishing Services Network.

Mazzetto, et al., "Adversarial Multiclass Learning Under Weak Supervision With Performance Guarantees", Proceedings of the 38th International Conference on Machine Learning, Jul. 2021, 10 pages.

Mazzetto, et al., "Semi-Supervised Aggregation of Dependent Weak Supervision Sources With Performance Guarantees", Proceedings of the 24th International Conference on Artificial Intelligence and Statistics, San Diego, CA, 2021, 13 pages.

Payne, "The Role of Chatbots in Project Management Strategy", Botsify, May 21, 2021, Available online at: https://botsify.com/blog/the-role-of-chatbots-in-project-management-strategy/, 8 pages.

Piriyakulkij, et al., "TAGLETS: A System for Automatic Semi-Supervised Learning with Auxiliary Data", Proceedings of the 5th MLSys Conference, Santa Clara, CA, May 5, 2022, 21 pages.

Ratner, et al., "Data Programming: Creating Large Training Sets, Quickly", Advances in Neural Information Processing Systems, Dec. 2016, pp. 3567-3575, vol. 29, HHS Public Access.

Ratner, et al., "Snorkel: Fast Training Set Generation for Information Extraction", SIGMOD '17: Proceedings of the 2017 ACM International Conference on Management of Data, Chicago, IL, May 14-19, 2017, 4 pages.

Ratner, et al., "Learning to Compose Domain-Specific Transformations for Data Augmentation", Advances in Neural Information Processing Systems, Sep. 30, 2017, vol. 30, 18 pages.

Ratner, et al., "Snorkel: Rapid Training Data Creation with Weak Supervision", Proceedings of the VLDB Endowment, Nov. 28, 2017, vol. 11, No. 3, 17 pages.

Ratner, et al., "Snorkel MeTaL: Weak Supervision for Multi-Task Learning", Proceedings of the Second Workshop on Data Management for End-to-End Machine Learning, Houston, TX, Jun. 2018, 14 pages, HHS Public Access.

Ratner, et al., "Training Complex Models with Multi-Task Weak Supervision", Proceedings of the AAAI Conference on Artificial Intelligence, AAAI Conference on Artificial Intelligence, Dec. 7, 2018, 31 pages.

Ratner, et al., "The Role of Massively Multi-Task and Weak Supervision in Software 2.0", Conference on Innovative Data Systems Research, Monterey, CA, Jan. 2019, 8 pages.

Re, "Software 2.0 and Snorkel: Beyond Hand-Labeled Data", KDD 201818: Proceedings of the 24th ACM SIGKDD International Conference on Knowledge Discovery & Data Mining, Jul. 19, 2018, 1 page.

Sanh, et al., "Multitask Prompted Training Enables Zero-Shot Task Generalization", Published as a conference paper at ICLR 2022, Mar. 17, 2022, 216 pages.

Shin, et al., "Universalizing Weak Supervision", Published as a conference paper at ICLR 2022, Mar. 17, 2022, 32 pages.

Streebo, "Artificial Intelligence Powered Employee Self-Service HR Chatbot: Smart Bots for Human Resource (HR), IT, Operations & Support", Streebo, Believed to be published at least as early as Sep. 28, 2020, Available online at: https://www.streebo.com/chatbot-for-hr, 13 pages.

Suri, et al., "Leveraging Organizational Resources to Adapt Models to New Data Modalities", Proceedings of the VLDB Endowment, Aug. 23, 2020, vol. 13, No. 12, 15 pages.

(56) References Cited

OTHER PUBLICATIONS

Varma, et al., "Socratic Learning: Augmenting Generative Models to Incorporate Latent Subsets in Training Data", Machine Learning, Sep. 28, 2017, 17 pages.

Varma, et al., "Inferring Generative Model Structure with Static Analysis", Advances in Neural Information Processing Systems, Dec. 2017, pp. 239-249, vol. 30, HHS Public Access.

Varma, et al., "Snuba: Automating Weak Supervision to Label Training Data", Proceedings of the VLDB Endowment. International Conference on Very Large Data Bases, Nov. 1, 2018, pp. 223-236, vol. 12, No. 3, HHS Public Access.

Varma, et al., "Learning Dependency Structures for Weak Supervision Models", Proceedings of the 36th International Conference on Machine Learning, Mar. 14, 2019, 23 pages.

Varma, et al., "Multi-Resolution Weak Supervision for Sequential Data", Advances in Neural Information Processing Systems 32 (NeurIPS 2019), Oct. 21, 2019, 26 pages.

Wang, et al., "A Clinical Text Classification Paradigm Using Weak Supervision and Deep Representation", BMC Medical Informatics and Decision Making, Jan. 7, 2019, vol. 19, No. 1, 13 pages.

Weng, et al., "Utilizing Weak Supervision to Infer Complex Objects and Situations in Autonomous Driving Data", 2019 IEEE Intelligent Vehicles Symposium (IV), Paris, France, Jun. 9-12, 2019, pp. 119-125.

Wu, et al., "Fonduer: Knowledge Base Construction from Richly Formatted Data", Proceedings. ACM-SIGMOD International Conference on Management of Data, Jun. 2018, pp. 1301-1316, HHS Public Access.

Yu, et al., "Learning from Multiple Noisy Partial Labelers", Proceedings of The 25th International Conference on Artificial Intelligence and Statistics, Mar. 25, 2022, 23 pages.

Zhang, et al., "WRENCH: A Comprehensive Benchmark for Weak Supervision", Proceedings of the Neural Information Processing Systems Track on Datasets and Benchmarks 1, Oct. 11, 2021, 29 pages.

Zhang, et al., "Creating Training Sets via Weak Indirect Supervision", Published as a conference paper at ICLR 2022, Mar. 14, 2022, 39 pages.

* cited by examiner

PROCESS MODELING TECHNIQUES FOR PROVIDING USER-SPECIFIC PROCESS SCHEDULE DATA

TECHNICAL FIELD

This disclosure relates generally to the field of process management data, and more specifically relates to modeling expert processes.

BACKGROUND

Organization of a subject-matter expert (SME) process may require detailed information regarding a very large quantity of information about the SME process. Some examples of SME processes can include construction projects, performing an audit, conducting a controlled trial for a medical procedure, implementing cybersecurity software and training, developing software or hardware, or other processes that include multiple highly detailed stages with interrelated execution. An SME process can involve multiple stages, each having particular inputs, outputs, execution criteria, or other requirements to be accounted for during a particular stage. In some cases, details about an SME process might be selected from a very large quantity of documents (e.g., hundreds or thousands of documents), and the quantity of requirements for an SME process might be larger than a human can readily comprehend. In addition, interactions or dependencies among stages of the SME process can create additional complexity for potential implementations of the SME process, further inhibiting or limiting human comprehension of the SME process.

In some cases, the complexity of stages in an SME process can be difficult for a person to comprehend. A person who is tasked with comprehending, organizing, or executing an SME process might struggle with understanding the process stages, requirements of the stages, dependencies among the stages, or other aspects of the SME process. In some cases, poor human understanding of an SME process can result in errors, inefficiencies, or other problematic outcomes during implementation of the SME process, such as stages that are included or excluded by mistake, inefficient use of human effort or computing resources, or loss of physical resources.

It is desirable to develop technical tools that can rapidly determine information that accurately describes an SME process. In addition, it is desirable for technical tools to accurately determine efficient implementation details for organizing stages in an SME process, and present the determined implementation details via a user interface that is easily understood.

SUMMARY

According to certain embodiments, a process analysis computing system receives input data that identifies an SME process. The process analysis computing system includes a user-specific execution engine and a scenario selection engine. The scenario selection engine extracts from the input data a set of process factors and a set of user factors. The set of process factors describes the SME process. The set of user factors describes a user account that is associated with the user-specific execution engine. Based on the set of process factors, the scenario selection engine determines initial schedule data describing event stages and milestone stages included in the SME process. Based on the set of user factors, the scenario selection engine generates user-specific process schedule data. The user-specific process schedule data includes at least one event stage and at least one milestone stage from the initial schedule data. The scenario selection engine provides the user-specific process schedule data to the user-specific execution engine. The process analysis computing system receives a request to access a resource. The resource is associated with a particular event stage in the user-specific process schedule data. The scenario selection engine determines that the particular event stage has a dependency on a particular milestone stage in the user-specific process schedule data, such as an incomplete milestone stage. Based on the determination, the process analysis computing system denies access to the requested resource.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings, where.

DETAILED DESCRIPTION

Figure 1:
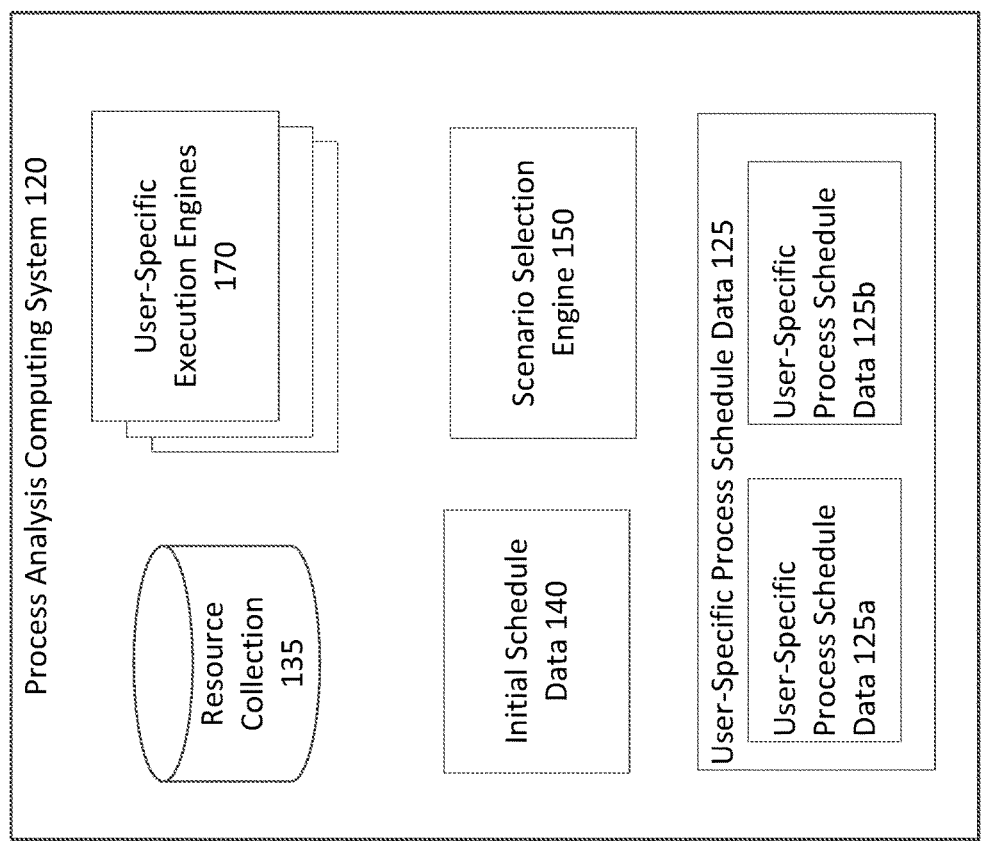
FIG. 1 is a block diagram depicting an example of a computing environment in which a process analysis computing system generates user-specific process schedule data describing an SME process, according to certain embodiments.

As discussed above, contemporary techniques for organizing SME processes can rely on extensive data repositories that describe execution criteria and other requirements for a particular SME process. Data that describes SME process requirements can be arranged as document collections, tables of numeric entries, regulatory requirements, or other types of data arranged according to specialized notation that is subject-matter specific. In some cases, data describing SME process requirements can be difficult for individuals to interpret without aid from computer-implemented tools. For example, contemporary SME process data describing structural properties requirements for materials used in public construction projects may be arranged in data tables that are not intended for human interpretation (e.g., a database). In addition, data that describes SME process requirements can change over time. Changes over time can include sudden changes such as new regulatory requirements, gradual changes such as evolving best practices, strategic changes such as requirements that are suitable in a first implementation of an SME process while being unsuitable in a second implementation of the same SME process, or other types of changes. In some cases, a person who has previous expertise in a particular SME process can be unaware of changes in the data describing SME process requirements and may be unable to accurately comprehend the changes without aid from computer-implemented tools.

In some cases, human interpretation of data describing SME process requirements is subject to a high incidence of errors or misinterpretation during the interpretation. For instance, a person who is attempting to interpret contemporary SME process data for implementing cybersecurity tools and practices within an organization might unintentionally introduce errors in a cybersecurity SME process, such as by selecting software that is inappropriate for the organization, accessing outdated training data, misunderstanding content of government regulations data describing cybersecurity requirements for the organization type, or other types of errors resulting from the person's poor understanding of the contemporary SME process data. In addition, the person who is attempting to interpret the contemporary SME process data may be unable to identify the errors, or unsure of how to remedy errors that are identified. For example, if the person has previously relied on a team member or written resource to assist with interpretation, the person may be uncertain of how to receive assistance if the team member or written resource is no longer available (e.g., retirement of the team member, deprecation of the written resource).

In some cases, contemporary tools for interpreting SME process data can be inadequate for organizing an SME process that utilizes the data. In addition, contemporary tools for interpreting SME process data may fail to integrate multiple sources of SME process data, or fail to aid comprehension of the SME process data. For example, a person who is attempting to organize an SME process for constructing a vehicle bridge on a municipal roadway might use multiple contemporary computer-implemented tools to access multiple sources of SME process data related to construction (e.g., structural properties requirements for construction materials, municipal guidelines for rerouting traffic during construction, federal regulations for managing water runoff during public construction projects). However, the example contemporary computer-implemented tools may fail to integrate data provided by the multiple sources of SME process data, such as a failure to determine that structural properties requirements for water runoff management (e.g., drainage culverts) could be different from structural properties requirements for a vehicle bridge span. In addition, the example contemporary computer-implemented tools may reduce comprehension of the SME process data by the person, such as by failing to identify subsets of the SME process data that are more relevant (or less relevant) for the example construction project. Furthermore, the example contemporary computer-implemented tools may fail to indicate potential inefficiencies in the SME process being organized, such as inefficient use of human effort, physical materials, computing resources, transportation effort (e.g., timing of materials delivery), project time, or other types of inefficiencies in an SME process. In addition, the example contemporary computer-implemented tools may fail to identify characteristics of the person who is attempting to organize the SME process, such as characteristic data indicating the person is inexperienced in organizing the particular type of SME process.

Certain embodiments described herein provide techniques to generate user-specific process schedule data that describes an SME process. A process analysis computing system can generate the user-specific process schedule data based on process factors and user factors that are extracted from input data describing the SME process. In addition, the process analysis computing system can identify, for inclusion in the user-specific process schedule data, a subset of event stages and milestone stages that are associated with the SME process. In some cases, generating the user-specific process schedule data or identifying the subset of event stages and milestone stages can improve the user's comprehension of the SME process. For example, based on the process factors, the process analysis computing system could identify a set of all event stages and milestone stages that are associated with the SME process. In addition, based on the user factors, the process analysis computing system could identify the subset event stages and milestone stages that are associated with the SME process and also are relevant to a particular user who is involved with implementing the SME process, such as a user of the process analysis computing system. In some cases, the process analysis computing system can control access to a resource that is associated with the SME process based on the user-specific process schedule data. For example, the process analysis computing system could receive a request to access an SME process resource that is associated with a particular event stage described in the user-specific process schedule data. In response to determining that the event stage has a dependency on an incomplete milestone stage described in the user-specific process schedule data, the process analysis computing system can deny access to the resource. In some cases, the process analysis computing system generates recommendation data describing the user-specific process schedule data, such as a recommendation describing an activity to complete a milestone stage or improve efficiency of the SME process.

The following examples are provided to introduce certain embodiments of the present disclosure. In the example implementation, a process analysis computing system receives, from a user computing device, input data that identifies an SME process. The process analysis computing system receives the input data via a user-specific execution engine that is associated with a user account for the user computing device. A scenario selection engine included in the process analysis computing system analyzes the input data and extracts a set of process factors and a set of user factors. The set of process factors describes the SME process. The set of user factors describes the user account associated with the user-specific execution engine. Based on the set of process factors, the scenario selection engine determines initial schedule data that includes event stages and milestone stages included in the SME process. Event stages can describe particular portions of an SME process that contribute to completion of the SME process, such as event stages that describe ordering raw materials or scheduling a contractor. Milestone stages can describe particular portions of an SME process on which other stages (e.g., other portions of the process, completion of the entire process) are dependent, such as milestone stages that describe inspections, receipt of raw materials, or certification of output (e.g., from event stages). Based on the set of user factors, the scenario selection engine generates user-specific process schedule data that includes a subset of the event stages and a subset of the milestone stages from the initial schedule data. The scenario selection engine determines the subset based on, for example, a particular user characteristic indicating a level of experience or a historical indication of a particular stage running behind schedule. In the process analysis computing system, the user-specific execution engine accesses the user-specific process schedule data. In addition, the user-specific execution engine provides some or all of the user-specific process schedule data to the user computing device. In some cases, the user-specific execution engine generates user-specific visualization data or user-specific recommendation data related to the user-specific process schedule data.

Continuing with the above example, the process analysis computing system receives, from the user computing device, a request to access a resource that is related to the SME process. The scenario selection engine determines that the resource is associated with a particular event stage in the user-specific process schedule data. In addition, the scenario selection engine determines that the particular event stage has a dependency on a milestone stage in the user-specific process schedule data. Based on the determination, the process analysis computing system controls access to the requested resource. For example, based on a determination that the particular event stage has a dependency on an incomplete milestone stage, the scenario selection engine denies access to the requested resource. In addition, based on an additional determination that the particular event stage has a dependency on a complete milestone stage, the scenario selection engine permits access to the requested resource.

Certain embodiments described herein provide improved techniques for providing accurate data for organizing an SME process with multiple process stages. For example, a process analysis computing system can utilize particular rules to identify an SME process related to a data input or analyze multiple resource collections describing stages or other requirements of the SME process. In addition, the process analysis computing system can also utilize particular rules to determine a subset of the SME process stages and generate user-specific process schedule data describing the subset of stages. Furthermore, the process analysis computing system can also utilize particular rules to provide a recommendation data output describing a potential efficiency improvement for the SME process. The utilization of the particular rules can generate new or additional computer-implemented data structures, such as the user-specific process schedule data or the recommendation data output, that describe the identified SME process with increased accuracy compared to human analysis or contemporary tools for accessing the multiple data repositories. In addition, the new or additional computer-implemented data structures describe the SME process with increased relevance for a particular user of the process analysis computing system. The increased relevance may result in improved comprehension of the SME process by the user. In some cases, a process analysis computing system that uses techniques described herein can provide an individual, such as a person who organizes SME processes, with high-accuracy data describing a particular SME process or potential improvements to the particular SME process. In addition, the example process analysis computing system that uses the described techniques can reduce errors in the particular SME process, such as by identifying stages of the particular SME process that require additional verification, or by determining that the person organizing the particular SME process is an inexperienced organizer, or by analyzing additional aspects of the particular SME process indicated in the data input.

Referring now to the drawings, FIG. 1 is a diagram depicting an example of a computing environment 100, in which a process analysis computing system 120 provides user-specific process schedule data describing one or more SME processes. The computing environment 100 can include the process analysis computing system 120 and one or more user computing devices, such as a user computing device 190 or a user computing device 180. In some cases, the computing environment 100 can include one or more resource computing systems, such as supplementary resource computing systems 110. The process analysis computing system 120 can be configured to communicate with one or more of the user computing devices 190 or 180 or the supplementary resource computing systems 110, such as communication via at least one computing network.

In the computing environment 100, the process analysis computing system 120 can generate or identify SME process data that is specific to a particular person, such as user-specific process schedule data 125*a* or user-specific process schedule data 125*b* (collectively referred to herein as user-specific process schedule data 125). For example, the user-specific process schedule data 125*a* or 125*b* can be associated with a particular user who has provided, via a computing device, input data describing a particular SME process. In some cases, the process analysis computing system 120 generates user-specific process schedule data based on a combination of SME process data and user characteristic data. For instance, the process analysis computing system 120 could generate, based on analysis of additional SME process data, one or more process factors that describe the particular SME process indicated by the input data. In addition, the process analysis computing system 120 could generate, based on analysis of user characteristic data, one or more user factors that describe the user who provided the input data. Based on a combination of the process factors and the user factors, the process analysis computing system 120 can generate some or all of the user-specific process schedule data 125 that describes the particular SME process in a manner that is adjusted for the user who provided the input data.

In FIG. 1, the process analysis computing system 120 can be configured to receive, from one or more of the user computing devices 190 or 180, input data that describes a particular SME process. For example, the user computing device 190 could receive, via a first user interface, input data 195 that describes a first SME process. In addition, the user computing device 180 could receive, via a second user interface, input data 185 that describes a second SME process. In some cases, the first and second SME processes described by the input data 195 and 185 could be a same or similar SME process, such as an SME process for performing a financial audit. In addition, the first and second SME processes described by the input data 195 and 185 could be different SME processes, such as an SME process for performing a financial audit and an additional SME process for completing a construction project. In some cases, one or more of the input data 195 or 185 can include data describing a particular user who has provided the respective input data 195 or 185, such as user characteristic data describing a user account associated with a particular user computing device that received the input data 195 or 185.

The process analysis computing system 120 can receive one or more of the input data 195 from the user computing device 190 or the input data 185 from the user computing device 180. In some cases, the process analysis computing system 120 includes one or more user-specific execution engines 170 that are configured to communicate with one or more user computing devices. In some cases, the process analysis computing system 120 includes a particular user-specific execution engine that is associated with a particular user computing device. For example, the process analysis computing system 120 may generate a first instance of the user-specific execution engine 170 that is associated with the user computing device 190. The first instance of the user-specific execution engine 170 could receive the input data 195. In addition, the process analysis computing system 120 may generate a second instance of the user-specific execution engine 170 that is associated with the user computing device 180. The second instance of the user-specific execution engine 170 could receive the input data 185. In some cases, each of the user-specific execution engines 170 is configured to provide additional data to the associated user computing device, such as recommendation data describing at least a portion of the user-specific process schedule data 125, visualization data that can be interpreted by the user computing device to display via a user interface, or other types of data that could be received by the associated user computing device.

Based on the received input data 195 and 185, the process analysis computing system 120 can identify the first SME process described by the input data 195 and the second SME process described by the input data 185. In FIG. 1, the process analysis computing system 120 includes a scenario selection engine 150 that is configured to extract one or more process factors from each of the input data 195 and 185. The extracted process factors can describe the first and second SME processes. Examples of process factors can include a type of SME process (e.g., a financial audit, a construction project, implementing cybersecurity policies), a quantity of process stages, jurisdiction or regulatory requirements, financial limits for a particular process stage, a historical outcome for an additional SME process, or other characteristics that describe an SME process. In some cases, the scenario selection engine 150 can determine, based on the extracted process factors, that the input data 195 and 185 describe a same (or similar) SME process, such as the example financial audit process.

In FIG. 1, the scenario selection engine 150 is configured to extract one or more user factors from each of the input data 195 and 185. The extracted user factors can describe a particular user (or associated user account) that provided the input data 195 (or 185) to the user computing device 190 (or 180). Examples of user factors can include a level of experience with the indicated SME process or other SME processes, a setting on a user account (e.g., a data visualization preference), a level of access for a user account, a user role described by a user account (e.g., junior software developer, senior operations manager), a change in a described user role (e.g., promotion, recent training received, transfer between departments) a historical outcome for an additional SME process associated with a user, a connection among multiple users (e.g., a supervisor-direct report relationship), or other characteristics that describe a particular user (or associated user account). In some cases, the scenario selection engine 150 could generate a user factor based on a user account associated with the input data 195 or 185. For example, if the input data 195 is received via a first user account that indicates previous experience with the identified SME process (e.g., a professional certification, historical records indicating previous SME processes of a same or similar type), the scenario selection engine 150 could extract a user factor that indicates a relatively high level of experience for the SME process. In addition, if the input data 185 is received via a second user account that indicates no or little previous experience with the identified SME process, the scenario selection engine 150 could extract a user factor that indicates a relatively low level of experience for the SME process.

In addition, the scenario selection engine 150 could generate a user factor based on a portion of the input data 195 or 185 that indicates a user's description of the identified SME process. For example, if the input data 195 includes text that describes the identified SME process at a relatively high level of detail (e.g., "GAAS-compliant external audit for C-corporation"), the scenario selection engine 150 could extract a user factor that indicates a relatively high level of experience for the SME process. In addition, if the input data 185 includes text that describes the identified SME process at a relatively low level of detail (e.g., "audits for large companies"), the scenario selection engine 150 could extract a user factor that indicates a relatively low level of experience for the SME process. In some cases, the scenario selection engine 150 could request additional data describing the indicated SME process. For example, the scenario selection engine 150 could provide to the user computing device 190 or 180, via a respective instance of the user-specific execution engine 170, query data that requests additional information from the user about the user's familiarity with the indicated SME process, a target completion date, or other aspects of the indicated SME process. Based on received data responding to the query data (e.g., received via the respective instance of the user-specific execution engine 170), the scenario selection engine 150 could determine one or more additional process factors or user factors.

In some cases, the scenario selection engine 150 could extract at least one user factor or process factor that indicates a risk associated with the user or the indicated SME process, or a combination of associated risks. For example, if the scenario selection engine 150 determines that the user has a relatively low level of experience, or that the indicated SME process is relatively complex, at least one user factor and or process factor could indicate an elevated risk associated with implementation of the SME process by the user.

Based on one or more of the extracted process factors or the extracted user factors, the process analysis computing system 120 determines a set of data that describes the SME process indicated by the input data 195 and 185. In some cases, the process analysis computing system 120 can determine initial schedule data 140 describing the SME process based on one or more of the process factors. In addition, the process analysis computing system 120 can modify the initial schedule data 140 based on one or more of the user factors. For example, the process analysis computing system 120 can generate the user-specific process schedule data 125 based on the modification of the initial schedule data 140.

In the computing environment 100, the scenario selection engine 150 analyzes one or more of the process factors to determine the initial schedule data 140 describing the example financial audit SME process. In some cases, analysis by the scenario selection engine 150 can include comparing one or more of the process factors to a resource collection 135. The resource collection 135 can include data that describes one or more SME processes, such as historical documents (or other data records) describing previously implemented SME processes, data records indicating execution criteria or other requirements, procedural documents indicating standardized or required SME process stages, or other types of data that can describe an SME process. In some cases, the resource collection 135 can include data records indicating user accounts (or other user data) associated with users who are experienced with one or more SME processes, such as a data record indicating that the first user account (e.g., associated with the input data 195) has a relatively high level of experience for the indicated SME process. In some cases, one or more of the scenario selection engine 150 or the process analysis computing system 120 can access at least one of the supplementary resource computing systems 110. For example, the scenario selection engine 150 could determine the initial schedule data 140 based on data received from one or more of a supplementary resource collection 102 or a supplementary analysis system 104. Examples of the supplementary resource computing systems 110 could include government-operated computing systems that describe regulatory requirements for SME processes, databases operated by standards-setting organizations (such as tables describing construction materials properties or other standardized data sets), third-party expert analysis systems, or other computer systems configured to provide resources related to SME processes. In some cases, the resource collection 135 (or any of the supplementary resource computing systems 110) can include resources that cannot be readily understood by a human, such as repositories incudes hundreds or thousands of documents, or high-dimensional databases not intended for human interpretation. In some cases, the process analysis computing system 120 can improve implementation for a particular SME process by increasing efficient analysis of the resource collection 135 or the supplementary resource computing systems 110. In addition, the process analysis computing system 120 can improve implementation for a particular SME process by reducing human effort involved in analysis of the resource collection 135 or the supplementary resource computing systems 110.

In FIG. 1, the initial schedule data 140 can describe one or more event stages that are included in the SME process indicated by the input data 195 and 185. In addition, the initial schedule data 140 can describe one or more milestone stages that are included in the SME process indicated by the input data 195 and 185. Event stages can include, for instance, particular portions of an SME process that contribute to completion of the SME process. In the example SME process of a financial audit, the initial schedule data 140 could describe event stages such as gathering internal accounting data, gathering source data such as receipts or invoices, comparing the internal accounting data to the source data, and preparing a report that describes the audit results. In another example SME process of a construction project, the initial schedule data 140 could describe event stages such as performing a site analysis, ordering construction materials, assembling the construction project, and inspecting the project. Milestone stages can include, for instance, particular portions of an SME process on which other stages (e.g., other portions or completion of the entire process) are dependent. In the example SME process of the financial audit, the initial schedule data 140 could indicate that gathering the internal accounting data and gathering the source data are milestone stages, and that the event stage of comparing the internal accounting data to the source data is dependent on completion of the milestone stages for gathering data. In the example SME process of the construction project, the initial schedule data 140 could indicate that inspecting the project is a milestone stage, and that completion of the construction project is dependent on completion of the milestone stage for inspecting the project.

In addition, the scenario selection engine 150 modifies the initial schedule data 140 based on analysis of one or more of the user factors. In some cases, the scenario selection engine 150 generates the user-specific process schedule data 125 by modifying the initial schedule data that is included in the initial schedule data 140. Examples of modifications to the initial schedule data 140 can include selecting a subset of event stages or milestone stages, generating additional event stages or milestone stages, combining a subset of event stages or milestone stages, generating timeline data that describes an estimated amount of time to perform a subset of event stages or milestone stages, generating summary data describing an aspect of the SME process (e.g., a summary of the initial schedule data 140, a list of key points for the SME process), selecting additional user profile data for users who have expertise in the SME process, generating assistance data describing resources (e.g., published documents, training websites) that can provide additional information about aspects of the SME process, or other types of modifications that provide further information about the SME process described by the initial schedule data 140.

In some cases, the scenario selection engine 150 generates each of the user-specific process schedule data 125a and 125b based on respective modifications of the initial schedule data 140. For example, the scenario selection engine 150 can generate the user-specific process schedule data 125a based on a first modification of the initial schedule data 140. In some cases, the scenario selection engine 150 can generate the user-specific process schedule data 125a responsive to identifying one or more user factors or process factors, such as the user factor, extracted from the input data 195, indicating a relatively high level of experience for the SME process. In addition, the scenario selection engine 150 can generate the user-specific process schedule data 125a responsive to identifying one or more user factors or process factors that indicate a relatively low risk associated with the user or indicated SME process. The user-specific process schedule data 125a can include a first subset of the event stages and milestone stages described by the initial schedule data 140, such as a subset that excludes a particular milestone stage or event stage that could reduce efficiency for a user having the relatively high level of experience or an SME process having relatively low risk. For the example SME process of the financial audit, the user-specific process schedule data 125a could exclude a group of milestone stages that describe gathering source data from individual departments, based on analysis by the scenario selection engine 150 indicating that an experienced user would be unnecessarily delayed by the group of milestone stages. In addition, the scenario selection engine 150 could generate a particular milestone stage that is a combination of the group of milestone stages, such as a combination milestone stage that describes gathering source data from all of the individual departments. In some cases, responsive to identifying the user factors or process factors that indicate a relatively low risk associated with the user or indicated SME process, the scenario selection engine 150 can generate additional data for inclusion in the user-specific process schedule data 125a, such as timeline data indicating a relatively fast completion of event stages or milestone stages, or assistance data describing resources with a relatively in-depth level of detail.

In addition, the scenario selection engine 150 can generate the user-specific process schedule data 125b based on a second modification of the initial schedule data 140. In some cases, the scenario selection engine 150 can generate the user-specific process schedule data 125b responsive to identifying one or more user factors or process factors, such as the user factor, extracted from the input data 185, indicating a relatively low level of experience for the SME process. In addition, the scenario selection engine 150 can generate the user-specific process schedule data 125b responsive to identifying one or more user factors or process factors that indicate a relatively high risk associated with the user or indicated SME process. The user-specific process schedule data 125b can include a second subset of the event stages and milestone stages described by the initial schedule data 140, such as a subset that includes an additional milestone stage or event stage that could improve efficiency for a user having the relatively low level of experience or an SME process having relatively high risk. For the example SME process of the financial audit, the user-specific process schedule data 125b could include the group of milestone stages that describe gathering source data from individual departments, based on analysis by the scenario selection engine 150 indicating that an inexperienced user would benefit from being reminded of each department indicated by the group of milestone stages. In addition, the scenario selection engine 150 could generate an additional milestone stage that is not included in the initial schedule data 140, such as an additional milestone stage that requires review by an additional user who is more experienced with the type of SME process. In some cases, responsive to identifying the user factors or process factors that indicate a relatively high risk associated with the user or indicated SME process, the scenario selection engine 150 can generate additional data for inclusion in the user-specific process schedule data 125b, such as timeline data indicating a relatively slow completion of event stages or milestone stages, or assistance data describing resources with a relatively generalized level of detail.

In some cases, the process analysis computing system 120 can improve implementation of the indicated SME process by generating the user-specific process schedule data 125. For example, generating the user-specific process schedule data 125a that is tailored for an experienced user can improve efficiency by reducing human effort (e.g., omitting milestone stages or event stages that are repetitious for an experienced user) or reducing usage of computing resources or physical resources (e.g., combining computer analysis of financial data from multiple departments, combining transportation for multiple construction resources). In addition, generating the user-specific process schedule data 125b that is tailored for an inexperienced user can improve efficiency by reducing sources of error (e.g., providing additional information about the SME process, requiring more frequent review by additional users with more experience).

In the computing environment 100, the process analysis computing system 120 is configured to provide the user-specific process schedule data 125 (or a portion thereof) to one or more of the user computing devices 190 or 180, such as via a respective one of the user-specific execution engines 170. For example, the process analysis computing system 120 could provide the user-specific process schedule data 125a to the user computing device 190 via the first instance of the user-specific execution engine 170. In addition, the process analysis computing system 120 could provide the user-specific process schedule data 125b to the user computing device 180 via the second instance of the user-specific execution engine 170. In some cases, a particular one of the user-specific execution engine 170 generates additional data describing the user-specific process schedule data 125, such as data generated based on one or more process factors or user factors extracted by the scenario selection engine 150. For example, responsive to receiving the user factor indicating a relatively high level of experience for the SME process, the first instance of the user-specific execution engine 170 could generate first visualization data that describes the user-specific process schedule data 125a using a visualization that is adjusted for an experienced user (e.g., a Gantt chart, a project timeline). The first instance of the user-specific execution engine 170 could provide the first visualization data and the user-specific process schedule data 125a to the user computing device 190, which could be configured to display the user-specific process schedule data 125a based on the first visualization data. In addition, responsive to receiving the user factor indicating a relatively low level of experience for the SME process, the second instance of the user-specific execution engine 170 could generate second visualization data that describes the user-specific process schedule data 125b using a visualization that is adjusted for an inexperienced user (e.g., a game-like interface, a text description of event stages or milestone stages). The second instance of the user-specific execution engine 170 could provide the second visualization data and the user-specific process schedule data 125b to the user computing device 180, which could be configured to display the user-specific process schedule data 125b based on the second visualization data.

In some cases, the process analysis computing system 120 is configured to verify user-specific process schedule data that is generated. For example, the process analysis computing system 120 could provide one or more of the user-specific process schedule data 125a or 125b to a verification computing system. The verification computing system could be an additional user computing device that is associated with a particular user identified (e.g., via profile data) as having a high level of expertise in the SME process (or processes) described by the user-specific process schedule data 125a or 125b. In addition, the verification computing system could be configured to perform automated comparison of respective outputs from the process analysis computing system 120 and an additional process analysis computing system, such as by comparing the user-specific process schedule data 125a or 125b with additional user-specific process schedule data generated by the additional process analysis computing system. The process analysis computing system 120 could receive, from the verification computing system, correction data that indicates an accuracy level of the user-specific process schedule data 125a or 125b being verified. Based on the correction data, the process analysis computing system 120 could modify one or more of the user-specific process schedule data 125a or 125b. In addition, based on the correction data, the process analysis computing system 120 could modify one or more of the scenario selection engine 150, the user-specific execution engines 170, the resource collection 135, or any other component included in the process analysis computing system 120, such as to increase accuracy of subsequent operations performed by the component. In FIG. 1, verification is described as occurring prior to providing the user-specific process schedule data 125a or 125b to the user computing devices 190 or 180, but other implementations are possible. For example, a process analysis computing system could be configured to verify user-specific process schedule data subsequent to the user-specific process schedule data being provided to an additional computing system, such as performing an audit of a set of user-specific process schedule data generated in the previous month (or other suitable time period). In some cases, a process analysis computing system could be configured to receive verification data from an additional computing system, such as verification data generated by external review (e.g., automated review, review by personnel teams) of user-specific process schedule data. In some cases, a process analysis computing system could generate data requesting an external review, such as a review request generated in response to determining that a resource collection has been updated recently, has failed to receive an update (e.g., risk of the resource collection including outdated or stale information), or other circumstances that could trigger an automated request for external review.

In some cases, a process analysis computing system can control access to resources related to an SME process, based on user-specific process schedule data that describes the SME process. For example, a process analysis computing system could receive, from a user computing device, a request to access a computing analysis tool that is utilized during a particular event stage described in user-specific process schedule data associated with the user computing device. The process analysis computing system could determine that the particular event stage is dependent on another stage in the user-specific process schedule data, such as a particular milestone stage. In addition, the process analysis computing system could determine that the particular milestone stage is incomplete (e.g., the process analysis computing system is lacking data that describes completion of the particular milestone stage). Responsive to determining that the particular event stage has a dependency on an incomplete milestone stage, the process analysis computing system could deny the user computing device access to the computing analysis tool.

Figure 2:
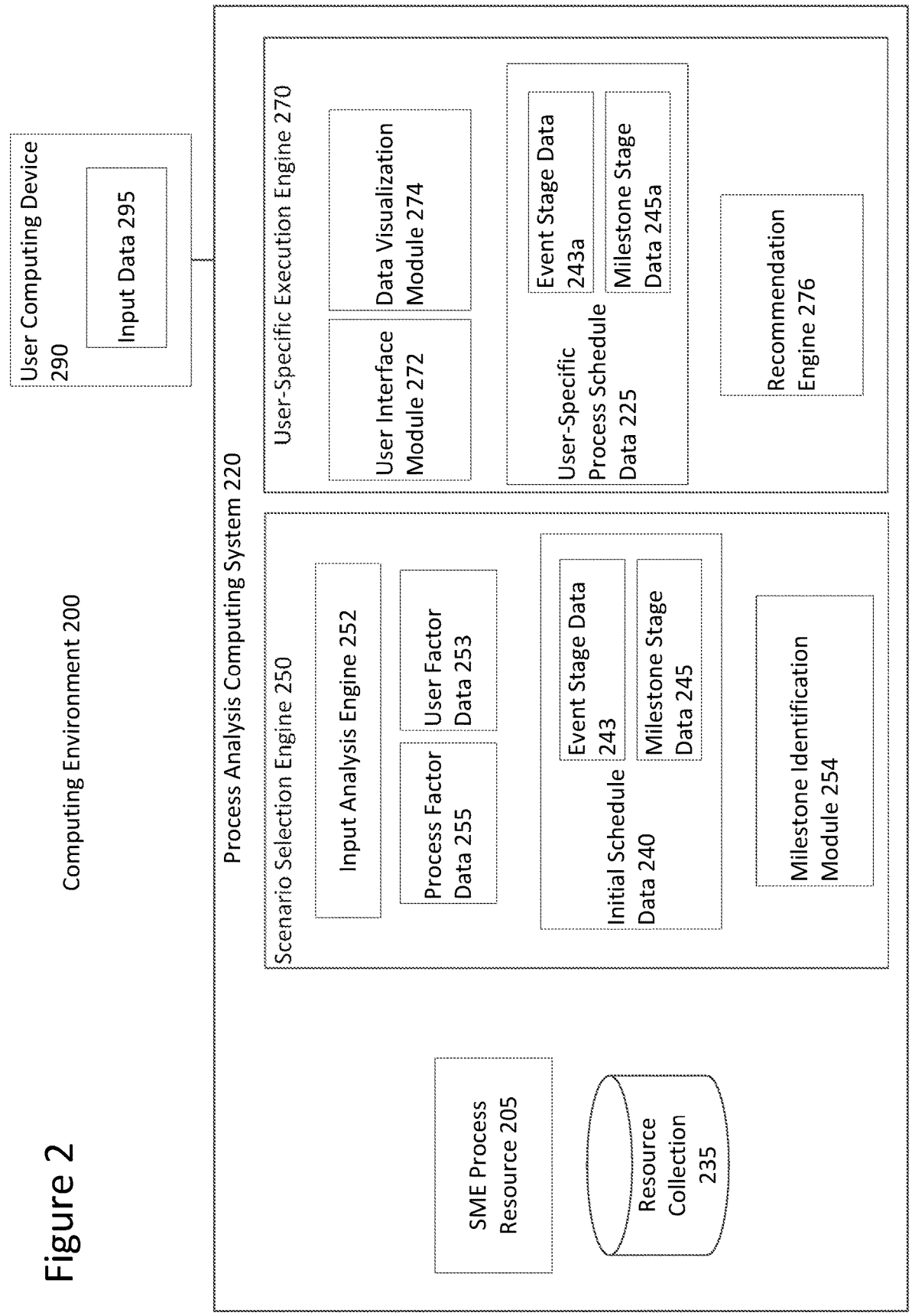
FIG. 2 is a block diagram depicting an example of a computing environment in which a process analysis computing system can control access to an SME process resource based on user-specific process schedule data, according to certain embodiments.

FIG. 2 is a diagram depicting an example of a computing environment 200 in which a process analysis computing system 220 can control access to an SME process resource 205, such as access control that is based on user-specific process schedule data 225. The computing environment 200 includes the process analysis computing system 220 and a user computing device 290 that is associated with the user-specific process schedule data 225. In FIG. 2, the process analysis computing system 220 generates the user-specific process schedule data 225 in response to input data 295 received from the user computing device 290. For example, the process analysis computing system 220 can determine that the input data 295 describes a particular SME process (as generally described in regard to FIG. 1). In addition, the process analysis computing system 220 can determine that the SME process resource 205 is associated with the particular SME process described by the input data 295. For instance, the SME process resource 205 could include a computer analysis tool that is utilized by one or more event stages or milestone stages included in the particular SME process. Additional examples of SME process resources to which the process analysis computing system 220 could control access could include scheduling resources (e.g., to request personnel or equipment for an SME process), budgeting or financial management resources, communication resources (e.g., to request assistance or verification for one or more stages in the SME process), supply chain or transportation resources, or other types of resources that are utilized by one or more SME processes.

In the computing environment 200, the process analysis computing system 220 includes a user-specific execution engine 270 and a scenario selection engine 250. In addition, the process analysis computing system 220 includes one or more resource collections, such as a resource collection 235, or is configured to access one or more supplementary resource computing systems (as generally described in regard to FIG. 1).

In the process analysis computing system 220, the user-specific execution engine 270 includes one or more of a user interface module 272, a data visualization module 274, or a recommendation engine 276. The user-specific execution engine 270 is associated with the user computing device 290 or a user account that is implemented on (or otherwise corresponds to) the user computing device 290. For example, the process analysis computing system 220 could generate the user-specific execution engine 270 in response to receiving the input data 295 (or other data) from the user computing device 290. In addition, the user-specific execution engine 270 can receive the input data 295, such as via a user interface module 272 that is included in the user-specific execution engine 270. In some cases, the user-specific execution engine 270 can identify or generate additional data related to the user computing device 290. For example, the user-specific execution engine 270 could request detail data related to the input data 295, such as data describing a user account that is implemented (e.g., logged in) on the user computing device 290. In addition, the user-specific execution engine 270 could generate data that describes a visualization (e.g., a chart, a timeline) of the user-specific process schedule data 225. In some cases, the user-specific execution engine 270 can exchange some or all of the additional data with the user computing device 290 via the user interface module 272, such as providing the visualization data or receiving detail data that describes more about an SME process indicated in the input data 295.

In the process analysis computing system 220, the scenario selection engine 250 can include one or more of an input analysis engine 252 or a milestone identification module 254. In some cases, the input analysis engine 252 can analyze input data received from one or more user-specific execution engines, such as the input data 295 from the user-specific execution engine 270. The input data 295 can include one or more of text data, audio data, gestural data, or another type of data describing information received from a user of the user computing device 290. In some cases, analysis of the input data 295 includes natural-language analysis. For example, if the input data 295 includes text or audio data that is a free-form input (e.g., "find information about financial audits") from a user of the user computing device 290, the input analysis engine 252 could perform natural-language analysis to extract one or more process factors or user factors. In some cases, the input analysis engine 252 can apply additional techniques to extract process or user factors, such as analysis via machine-learning techniques, weak supervision training, vector-based embeddings, keyword matching, or other types of analysis techniques.

Based on the analysis, the input analysis engine 252 generates data describing one or more extracted process factors or user factors, such as process factor data 255 and user factor data 253. For example, the input analysis engine 252 identifies the particular SME process described by the input data 295, such as by comparing one or more of the process factor data 255 or the user factor data 253 to the resource collection 235. In addition, the input analysis engine 252 generates initial schedule data 240 that describes the particular SME process. The initial schedule data 240 includes event stage data 243 that describes one or more event stages in the particular SME process. In addition, the initial schedule data 240 includes milestone stage data 245 that describes one or more milestone stages in the particular SME process. In FIG. 2, the initial schedule data 240 describes dependencies among the event stage data 243 and the milestone stage data 245, such as dependency data describing an event stage that has a dependency on a milestone stage. Examples of dependencies can include resource dependencies (e.g., a resource must be received or accessed before it can be used), signatory dependencies (e.g., an inspector, validator, or other party must approve a completed stage), financial dependencies (e.g., sufficient funds are required before beginning a stage), or other types of dependencies between stages in an SME process.

In the computing environment 200, the scenario selection engine 250 (or another component of the process analysis computing system 220) generates the user-specific process schedule data 225 by modifying the initial schedule data 240. Examples of modifications to the initial schedule data 240 can include selecting a subset of event stages or milestone stages, generating additional event stages or milestone stages, combining a subset of event stages or milestone stages, generating timeline data, generating summary data, selecting additional user profile data for users who have expertise in the SME process, generating assistance data, or other types of modifications that provide further information about the SME process described by the initial schedule data 240. In some cases, the milestone identification module 254 included in the scenario selection engine 250 modifies the initial schedule data 240. For example, the milestone identification module 254 analyzes the user factor data 253 or the process factor data 255, such as by comparing the user factor data 253 to additional user factor data associated with historical records in the resource collection 235. Based on the analysis, the milestone identification module 254 can modify one or both of the event stage data 243 or the milestone stage data 245. For example, the milestone identification module 254 can generate event stage data 243a that includes a modification of the event stage data 243. In addition, the milestone identification module 254 can generate milestone stage data 245a that includes a modification of the milestone stage data 245. In some case, the milestone identification module 254 could identify a subset of event stages described by the event stage data 243 or a subset of milestone stages described by the milestone stage data 245. The event stage data 243a or the milestone stage data 245a could include data describing the identified subsets. In addition, the milestone identification module 254 could generate data describing an additional event stage or an additional milestone stage. The event stage data 243a or the milestone stage data 245a could include data describing the additional stages.

In some cases, the milestone identification module 254 modifies one or both of the event stage data 243 or the milestone stage data 245 responsive to identifying a particular user characteristic described by the user factor data 253. For example, the milestone identification module 254 could identify the subsets of event or milestone stages in response to identifying a particular user characteristic that indicates a high level of experience with the particular SME process. In addition, the milestone identification module 254 could generate the data describing the additional event or milestone stage in response to identifying a particular user characteristic that indicates a low level of experience with the particular SME process. In some cases, the milestone identification module 254 can perform multiple modifications of the initial schedule data 240. For example, the process analysis computing system 220 could receive data indicating changes to the particular SME process, such as additional input data indicating that the particular SME process is behind schedule or describing an error found in an event or milestone stage marked as completed. Responsive to receiving the data indicating changes, the milestone identification module 254 might perform an additional modification to the initial schedule data 240, such as by adjusting data that describes scheduling or generating data describing an additional event stage or milestone stage (e.g., additional stages for correcting the found error). In addition, one or more of the event stage data 243a or the milestone stage data 245a could be modified to include the additional modification performed by the milestone identification module 254.

In FIG. 2, the scenario selection engine 250 generates or modifies the user-specific process schedule data 225 based on the modification (or multiple modifications) to the initial schedule data 240, such as generating or modifying the event stage data 243a or the milestone stage data 245a included in the user-specific process schedule data 225. In addition, the user-specific execution engine 270 receives (or otherwise accesses) the user-specific process schedule data 225. The data visualization module 274 (or another component of the process analysis computing system 220) can generate visualization data based on the user-specific process schedule data 225. In some cases, the visualization data can be generated based on one or more of the process user data 255 or the user factor data 253. For example, responsive to identifying, in the user factor data 253, a particular user characteristic that indicates a high level of experience with the particular SME process, the data visualization module 274 could generate visualization data that is adjusted for an experienced user. In addition, responsive to identifying, in the user factor data 253, a particular user characteristic that indicates a low level of experience with the particular SME process, the data visualization module 274 could generate visualization data that is adjusted for an inexperienced user. Examples of visualization data can include data intended for presentation via a visual display device, an audio display device, a tactile or haptic device (e.g., a Braille reader), a virtual reality display environment, or other forms of presentation suitable for various user interface types. In some cases, the data visualization module 274 could generate or modify visualization data to indicate possible problems with the particular SME process, such as missed due dates associated with a particular event or milestone stage, cost overruns, resource loss, or other types of problems that can occur in an SME process.

In some cases, the recommendation engine 276 included in the user-specific execution engine 270 can generate recommendation data based on one or more of the user-specific process schedule data 225, the process user data 255, or the user factor data 253. In addition, the recommendation engine 276 can generate user-specific recommendation data describing an improvement to the user-specific process schedule data 225, based on identification of particular characteristics in the process user data 255 or the user factor data 253. For example, the recommendation engine 276 could identify, in the process factor data 255, a particular process characteristic of the SME process described by the user-specific process schedule data 225. In addition, the recommendation engine 276 could identify, in the user factor data 253, a particular user characteristic of the user account associated with the user computing device 290. Responsive to identifying the particular characteristic in the process factor data 255 or the user factor data 253, the recommendation engine 276 could generate recommendation data that describes a potential efficiency improvement in the SME process. Examples of recommendation data based on analysis of the process factor data 255 could include a recommendation to use a particular vendor that has a history of delivering resources (e.g., construction materials) within schedule, a recommendation to modify a scope of the SME process to reducing testing time, or other types of recommendations determined based on analysis of process factor data. Examples of recommendation data based on analysis of the user factor data 253 could include a recommendation to contact an additional user who has performed the type of SME process recently (e.g., within a threshold time period), a recommendation to review an updated resource document, or other types of recommendations based on analysis of user factor data. In some cases, recommendation data could be generated or modified in response to additional input data. For example, the user interface module 272 could receive, from the user computing device 290, additional input data that describes a modification to one or more aspects of the particular SME process described by the input data 295, such as a modification to a target completion date or a scope of the SME process. In response to receiving the additional input data, the recommendation engine 276 could generate additional recommendation data that describes one or more potential impacts to the SME process, such as generation or removal (e.g., from the user-specific process schedule data 225) of one or more additional event stages or milestone stages. In some cases, generation of recommendation data responsive to additional input data can improve user comprehension of potential impacts on an SME process, such as potential impacts due to one or more proposed changes to a particular aspect of the SME process.

In FIG. 2, the process analysis computing system 220 can modify the initial schedule data 240, the user-specific process schedule data 225, or other generated data objects responsive to receiving additional data from an additional computing system. For example, the process analysis computing system 220 could receive update data from a supplementary resource computing system, such as a supplementary resource computing system operated by a governmental agency that regulates the SME process described by the initial schedule data 240. In addition, the process analysis computing system 220 could determine that the update data indicates a change to the SME process, such as a change in required criteria for the SME process. Responsive to determining that the update data indicates a change to the SME process, the scenario selection engine 250 could modify the initial schedule data 240 or the user-specific process schedule data 225, such as to indicate that one or more additional event stages or milestone stages are included in the SME process. In addition, the data visualization module 274 could generate additional visualization data describing the change. In addition, the recommendation engine 276 could generate additional recommendation data describing a potential impact of the change on the SME process. In addition, the user-specific execution engine 270 could generate alert data describing the change, or provide the alert data to one or more of the user computing device 290 or an additional computing system. In some cases, generating or modifying one or more of the initial schedule data 240, the user-specific process schedule data 225, alert data, recommendation data, or visualization data responsive to receiving update data indicating a change to an SME process can improve efficiency for implementing the SME process, improve user comprehension of the change, reduce resource waste related to outdated information about the SME process, or provide other improvements for implementing the SME process.

In the computing environment 200, the process analysis computing system 220 receives, from the user computing device 290, progress data indicating one or more stages described by the user-specific process schedule data 225. The progress data can describe, for example, completion of an event stage or milestone stage, an activity related to an event stage or milestone stage, a delay related to an event stage or milestone stage, or other types of progress that could affect completion of a stage in an SME process. Responsive to receiving the progress data, the user-specific execution engine 270 (or another component of the process analysis computing system 220) can modify the user-specific process schedule data 225 to indicate the type or amount of progress. For example, the user-specific execution engine 270 could modify the event stage data 243*a* to indicate that a particular event stage is completed, or the milestone stage data 245*a* to indicate that a particular milestone stage is completed. In addition, the user-specific execution engine 270 could generate additional data based on the progress data, such as additional visualization data indicating the update or additional recommendation data describing a recommendation that is based on the update. In some cases, the progress data is received by one or more additional components of the process analysis computing system 220. For example, responsive to receiving the progress data, the milestone identification module 254 could modify or generate data describing the milestone stages described by the user-specific process schedule data 225, such as log data that indicates completion of milestone stages. In addition, the process analysis computing system 220 could modify the resource collection 235 to include one or more historical records related to the SME process described by the user-specific process schedule data 225.

In some cases, the process analysis computing system 220 controls access to the SME process resource 205 based on the user-specific process schedule data 225. For example, the process analysis computing system 220 can receive, from the user computing device, a request to access the SME process resource 205. Responsive to receiving the access request, the scenario selection engine 250 could compare the access request to the user-specific process schedule data 225. Based on the comparison, the scenario selection engine 250 could identify that the SME process resource 205 is associated with a particular event stage described by the event stage data 243*a*. In addition, the scenario selection engine 250 could identify a dependency of the particular event stage on a particular milestone stage described by the milestone stage data 245*a*. For example, the scenario selection engine 250 could identify that the particular milestone stage, on which the particular event stage depends, is described as complete (e.g., progress data indicating completion has been received). Responsive to identifying the dependency of the particular event stage on the complete milestone stage, the scenario selection engine 250 permits access to the SME process resource 205, such as permitting access by one or more of the user-specific execution engine 270 or the user computing device 290. In addition, the scenario selection engine 250 could identify that the particular milestone stage, on which the particular event stage depends, is described as incomplete (e.g., progress data indicating completion has not been received). Responsive to identifying the dependency of the particular event stage on the incomplete milestone stage, the scenario selection engine 250 denies access to the SME process resource 205, such as denying access by one or more of the user-specific execution engine 270 or the user computing device 290. In some cases, the scenario selection engine 250 or the user-specific execution engine 270 generates alert data describing the denial. In addition, the generated alert data could describe additional aspects of the SME process described by the user-specific process schedule data 225, such as potential missed due dates or other possible problems with the SME process. The user-specific execution engine 270 can provide the alert data to the user computing device 290, such as via the user interface module 272. In some cases, the user-specific execution engine 270 (or another component of the process analysis computing system 220) can provide the alert data to one or more additional computing systems, such as an additional user computing device associated with a supervisor, inspector, or other party that is involved with the SME process described by the user-specific process schedule data 225.

In some cases, the process analysis computing system 220 can modify an access denial in response to receiving additional data related to the user-specific process schedule data 225. For example, subsequent to denying access to the SME resource process 205, the process analysis computing system 220 could receive additional progress data from the user computing device 290. The user-specific execution engine 270 (or another component of the process analysis computing system 220) could determine that the additional progress data describes completion of the milestone stage that had been indicated as incomplete. Responsive to receiving the additional progress data, the user-specific execution engine 270 can modify the user-specific process schedule data 225, such as modifying the milestone stage data 245a to indicate completion of the milestone stage. In some cases, the scenario selection engine 250 could identify one or more event stages described by the event stage data 243a that are dependent on the completed milestone stage. In addition, the scenario selection engine 250 could generate additional alert data (e.g., for the user computing device 290) describing availability of the SME process resource 205, or additional alert data (e.g., for an additional user computing device associated with a supervisor, inspector, or other party that is involved with the SME process) describing completion of the milestone stage. In response to receiving an additional request to access the SME process resource 205, the scenario selection engine 250 could grant access to the SME process resource 205, based on a determination that the SME process resource 205 is associated with an event stage that is dependent on a completed milestone stage.

Figure 3:
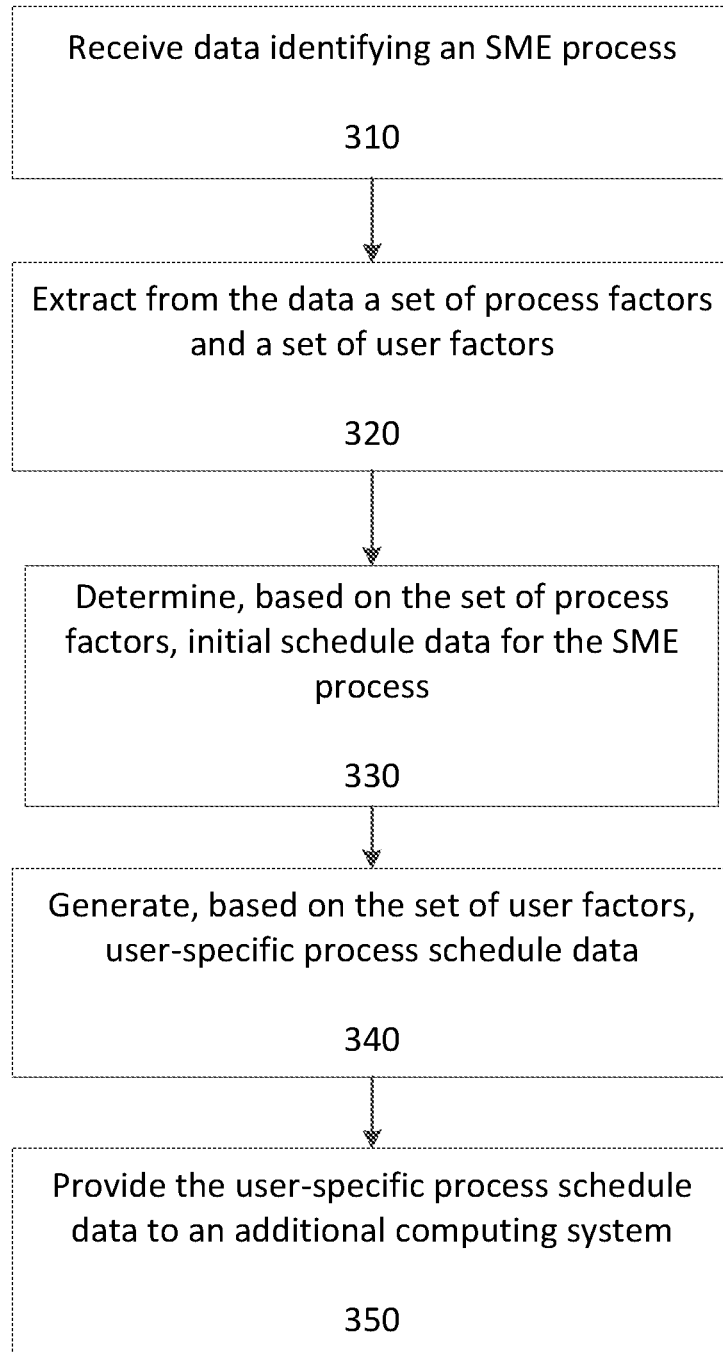
FIG. 3 is a flow chart depicting an example of a process for generating user-specific process schedule data describing an SME process, according to certain embodiments.

FIG. 3 is a flow chart depicting an example of a process 300 for generating user-specific process schedule data describing an SME process. In some embodiments, such as described in regards to FIGS. 1-2, a computing system executing a process analysis computing system implements operations described in FIG. 3, by executing suitable program code. For illustrative purposes, the process 300 is described with reference to the examples depicted in FIGS. 1-2. Other implementations, however, are possible.

At block 310, the process 300 involves receiving data that identifies an SME process, such as input data received from a user computing device. In some cases, the input data is associated with a user account, such as a user account implemented via (or otherwise associated with) the user computing device. For example, a process analysis computing system includes (or generates) a user-specific execution engine that is associated with the user computing device or the user account. The user-specific execution engine is configured to receive the input data from the user computing device. The process analysis computing system 220, for instance, includes the user-specific execution engine 270, which is configured to receive the input data 295 from the user computing device 290. The input data 295 identifies a particular SME process. In some cases, the scenario selection engine 250 determines, based on analysis of the input data 295, the SME process that is identified.

At block 320, the process 300 involves extracting, from the input data, a set of one or more process factors and a set of one or more user factors. The set of process factors can describe the identified SME process. The set of user factors can describe the user account associated with the user-specific execution engine or user computing device. A scenario selection engine included in the process analysis computing system is configured to extract the set of process factors or the set of user factors. For example, the scenario selection engine 250 generates the process factor data 255 that describes one or more process factors extracted from the input data 295. In addition, the scenario selection engine 250 generates the user factor data 253 that describes one or more user factors extracted from the input data 295. In some cases, the scenario selection engine extracts one or more process factors or user factors based on analysis of the input data, such as via natural-language processing techniques. In addition, the scenario selection engine extracts one or more process factors or user factors based on analysis of additional data associated with the input data, such as the user account implemented via the user computing device, a default user profile (e.g., if no user account is available), a database describing types of SME processes, or other additional data.

At block 330, the process 300 involves determining, initial schedule data for the identified SME process. In some cases, determining the initial schedule data is based on the set of process factors extracted from the input data. In addition, the initial schedule data describes one or more event stages included in the identified SME process and one or more milestone stages included in the identified SME process. The scenario selection engine is configured to determine the initial schedule data. For example, the scenario selection engine 250 generates the initial schedule data 240 based on analysis of the process factors data 255, the resource collection 235, one or more supplementary resource computing systems, or a combination of these or additional data sources. The initial schedule data 240 includes event stage data 243 and milestone stage data 245.

At block 340, the process 300 involves generating user-specific process schedule data that describes the identified SME process. The user-specific process schedule data is generated based on the set of user factors. In addition, the user-specific process schedule data includes one or more of the event stages and one or more of the milestone stages that are described by the initial schedule data. The scenario selection engine is configured to generate the user-specific process schedule data. For example, the scenario selection engine 250 generates the user-specific process schedule data 225 based on the process factor data 255. In addition, the user-specific process schedule data 225 includes the event stage data 243a, describing a subset of event stages described by the event stage data 243, and the milestone stage data 245a, describing a subset of milestone stages described by the milestone stage data 245.

At block 350, the process 300 involves providing the user-specific process schedule data to one or more additional computing systems, such as the user computing device from which the input data was received. In some cases, the user-specific execution engine provides the user-specific process schedule data to the one or more additional computing systems. For example, the user-specific execution engine 270 provides the user-specific process schedule data 225 to the user computing device 290, such as via the user interface module 272. In some cases, the user-specific execution engine provides additional data describing the user-specific process schedule data, such as visualization data that can be interpreted by the user computing device (or additional computing system) to display a chart or other representation of the user-specific process schedule data. In some cases, the user-specific execution engine (or another component of the process analysis computing system) provides the user-specific process schedule data to an additional user computing device. For example, the process analysis computing system could provide the user-specific process schedule data to an additional user computing device that is associated with an additional user account for a supervisor or colleague of the user of the user computing device.

Figure 4:
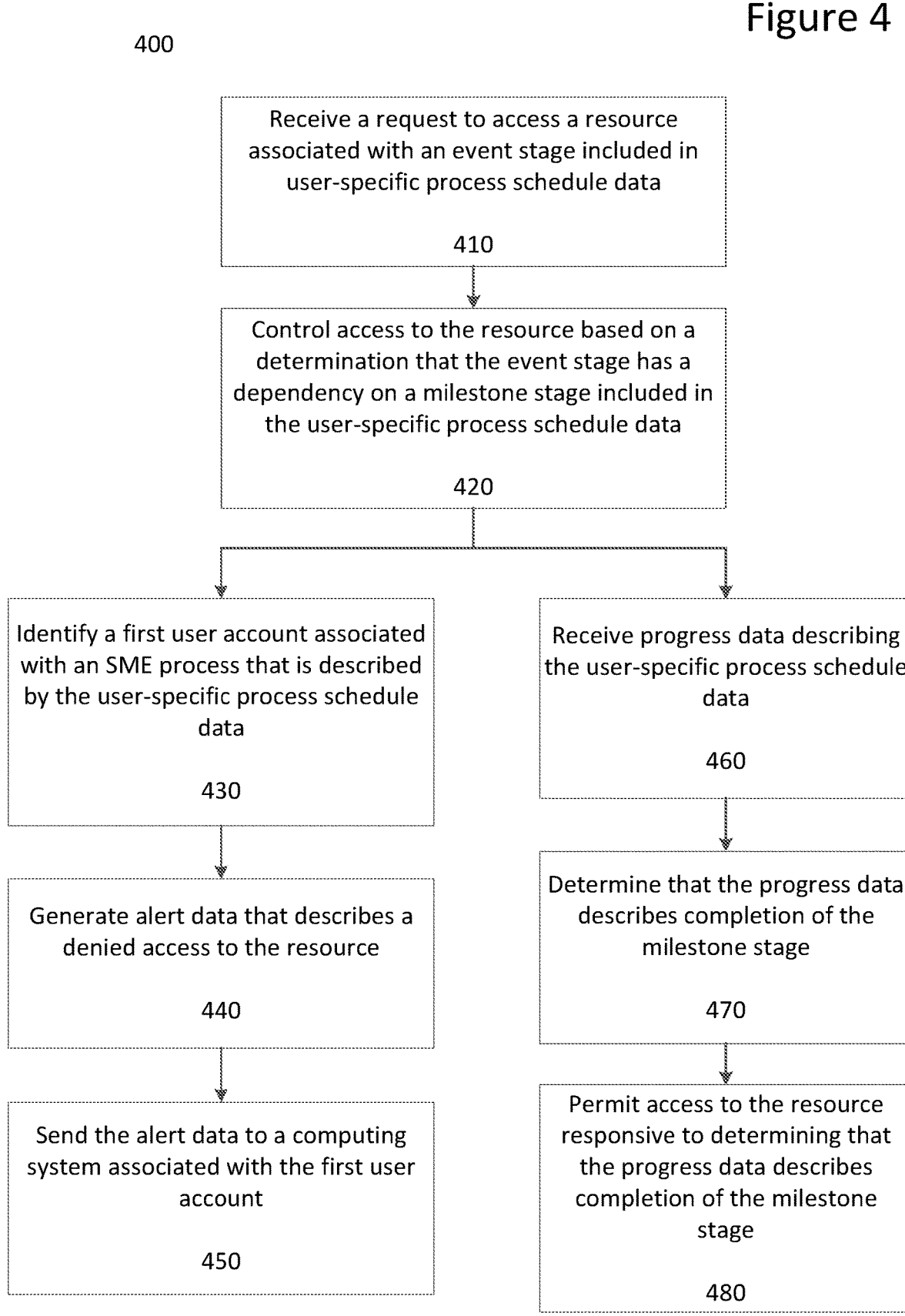
FIG. 4 is a flow chart depicting an example of a process for controlling access to a resource related to an SME process based on user-specific process schedule data, according to certain embodiments.

FIG. 4 is a flow chart depicting an example of a process 400 for controlling access to a resource related to an SME process. In some embodiments, such as described in regards to FIGS. 1-3, a computing system executing a process analysis computing system implements operations described in FIG. 4, by executing suitable program code. For illustrative purposes, the process 400 is described with reference to the examples depicted in FIGS. 1-3. Other implementations, however, are possible.

At block 410, the process 400 involves receiving request data that indicates a request to access a resource related to an SME process. In addition, the resource indicated by the request data is associated with an event stage described in user-specific process schedule data that describes the SME process. In some cases, a process analysis computing system receives the request data, such as from a user computing device (or an additional computing system) that is associated with the user-specific process schedule data. The request data is received via a user-specific execution engine that is associated with a user account implemented on (or otherwise associated with) the user computing device). For example, the user-specific execution engine 270 receives, from the user computing device 290, request data that describes a request to access the SME process resource 205.

At block 420, the process 400 involves controlling access to the requested resource, such as the process analysis computing system denying or permitting access by the user computing device to the requested resource. In some cases, the process analysis computing system controls access based on a determination that the requested resource is associated with an event stage that has a dependence on a milestone stage described in the user-specific process schedule data. For example, the process analysis computing system permits access to the requested resource based on a determination that the dependence is on a milestone stage that is indicated as complete. In addition, the process analysis computing system denies access to the requested resource based on a determination that the dependence is on a milestone stage that is indicated as incomplete. For example, the scenario selection engine 250 determines, based on the request data from the user computing device 290, that the requested SME process resource 205 is associated with a particular event stage described in the event stage data 243a. In addition, the scenario selection engine 250 determines that the particular event stage has a dependency on an incomplete milestone stage described in the milestone stage data 245a. Responsive to determining the dependency on the incomplete milestone stage, the scenario selection engine 250 denies access to the SME process resource 205, such as denying access by the user-specific execution engine 270 or the user computing device 290.

At block 430, the process 400 involves identifying a first user account that is associated with the user-specific process schedule data or the SME process described by the user-specific process schedule data. For example, the user-specific execution engine 270 or the scenario selection engine 250 identifies one or more user accounts associated with the user-specific process schedule data 225. In some cases, the first user account is associated with the user computing device from which the request data was received, such as a user account for the user computing device 290. In some cases, the first user account is associated with an additional user computing device, such as an additional user account for a supervisor or colleague of the person described by the user account for the user computing device 290.

At block 440, the process 400 involves generating alert data related to the requested resource, such as alert data that responds to the request data. In some cases, the alert data describes the access denial for the requested resource. In addition, the alert data describes one or more of the user-specific process schedule data, the event stage associated with the requested resource, the incomplete milestone stage on which the event stage depends, or other information related to the SME process described by the user-specific process schedule data. For example, one or more of the scenario selection engine 250 or the user-specific execution engine 270 generates alert data describing denial of access to the SME process resource 205. In addition, the generated alert data describes that the requested SME process resource 205 is associated with the particular event stage described in the event stage data 243a, and that the particular event stage has a dependency on the incomplete milestone stage described in the milestone stage data 245a. In some cases, the alert data describes the first user account or one or more additional user accounts. For example, the generated alert data indicates the user account associated with the user computing device 290, or the example additional user accounts for the supervisor or colleague, or a combination of multiple user accounts. In some cases, the alert data includes (or is associated with) recommendation data. For example, in response to determining that access to the SME process resource 205 is denied, the recommendation engine 276 generates recommendation data describing, for instance, an activity to complete the incomplete milestone stage, contact information for a person experienced with the SME process, or other information that could resolve the incomplete milestone stage or improve the SME process described by the user-specific process schedule data 225.

At block 450, the process 400 involves sending the alert data to a computing system that is associated with the first user account. In some cases, the process analysis computing system sends the alert data to one or more additional computing systems. For example, the user-specific execution engine 270 (or an additional component of the process analysis computing system 220) could send the generated alert data to the user computing device 290, or to the additional user computing device associated with the supervisor or colleague, or to a combination of multiple user computing devices.

At block 460, the process 400 involves receiving progress data that describes the user-specific process schedule data. In some cases, the progress data is received from the user computing device from which the request data was received, such as the user computing device 290. In some cases, the progress data is received from an additional computing system, such as the additional user computing device associated with the supervisor or colleague. For example, the scenario selection engine 250 receives, via the user-specific execution engine 270, progress data that describes one or more stages in the user-specific process schedule data 225.

At block 470, the process 400 involves determining that the progress data describes completion of a milestone stage, such as the incomplete milestone stage on which the event stage associated with the requested resource depends. In some cases, the user-specific execution engine modifies the user-specific process schedule data responsive to receiving the progress data, such as by a modification to indicate that the described milestone stage is completed. For example, responsive to receiving progress data from the user computing device 290 describing completion of a particular milestone stage, the user-specific execution engine 270 modifies the milestone stage data 245a to indicate the completed milestone stage.

At block 480, the process 400 involves permitting access to the requested resource, responsive to determining that the progress data describes completion of the milestone stage. In some cases, the scenario selection engine (or another component of the process analysis computing system) permits access to the requested resource based on a determination that the event stage associated with the requested resource has a dependency on the completed milestone stage, or that the event stages is dependent on a set of milestone stages that are all completed. In some cases, the process analysis computing system can permit access to the requested resource in response to receiving additional request data describing an additional request to access the resource. In addition, the process analysis computing system can generate additional alert data that describes an availability of the resource, such as additional alert data provided by the user-specific execution engine to the user computing device from which the request data received (e.g., as described in regard to block 410). For example, the scenario selection engine 250 determines that the milestone stage data 245a is modified to indicate completion of the particular milestone stage. In addition, one or more of the scenario selection engine 250 or the user-specific execution engine 270 generates additional alert data describing availability of the SME process resource 205. The user-specific execution engine 270 (or another component of the process analysis computing system 220) provides the additional alert data to the user computing device 290 or one or more additional computing systems. In addition, responsive to receiving, from the user computing device 290, additional request data describing a request to access the SME process resource 205, the scenario selection engine 250 allows one or more of the user-specific execution engine 250 or the user computing device 290 to access the SME process resource 205.

In some embodiments, some operations related to process 300 or process 400 can be repeated. In addition, some operations related to process 300 or process 400 can be performed in various sequences. For example, in regard to block 340, the process analysis computing system could perform multiple modifications to the user-specific process schedule data, such as modifications based on data received from one or more additional computing systems. In regard to block 460, the process analysis computing system could receive from the user computing device multiple progress data indicating the particular milestone stage. Responsive to each of the multiple progress data, the process analysis computing system could perform multiple modification to the user-specific process schedule data, or perform multiple analyses to determine, for each of the multiple progress data, whether the particular milestone stage is completed (or remains incomplete).

Figure 5:
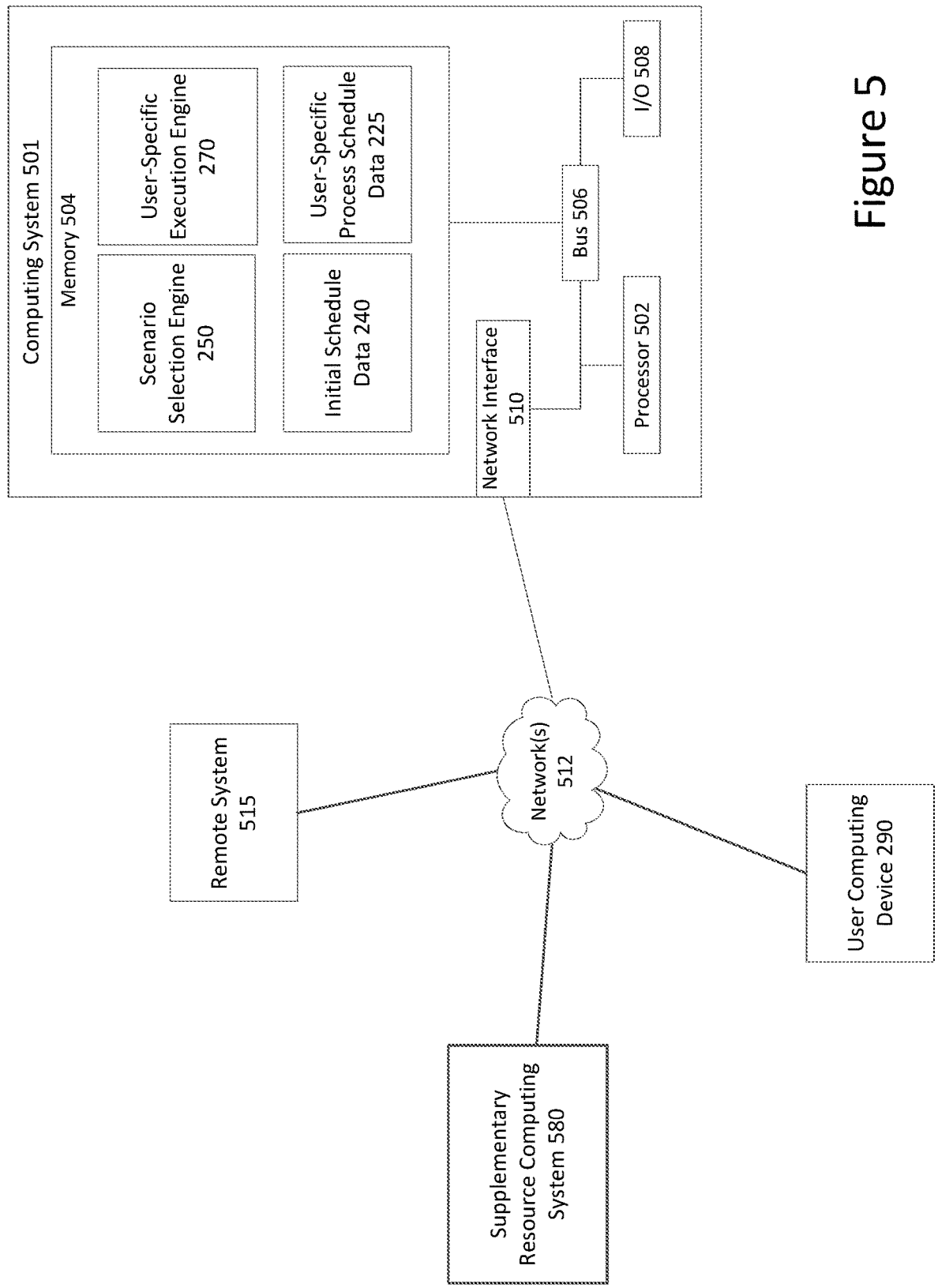
FIG. 5 is a block diagram depicting an example of a computing system for implementing a process analysis computing system, according to certain embodiments.

Any suitable computing system or group of computing systems can be used for performing the operations described herein. For example, FIG. 5 is a block diagram depicting a computing system 501 configured to implement a process analysis computing system, according to certain embodiments. The computing system 501 can be configured to implement the process analysis computing system 120, the process analysis computing system 220, or other embodiments described herein.

The depicted example of a computing system 501 includes one or more processors 502 communicatively coupled to one or more memory devices 504. The processor 502 executes computer-executable program code or accesses information stored in the memory device 504. Examples of processor 502 include a microprocessor, an application-specific integrated circuit ("ASIC"), a field-programmable gate array ("FPGA"), or other suitable processing device. The processor 502 can include any number of processing devices, including one.

The memory device 504 includes any suitable non-transitory computer-readable medium for storing the scenario selection engine 250, the user-specific execution engine 270, the initial schedule data 240, the user-specific process schedule data 225, and other received or determined values or data objects. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 501 may also include a number of external or internal devices such as input or output devices. For example, the computing system 501 is shown with an input/output ("I/O") interface 508 that can receive input from input devices or provide output to output devices. A bus 506 can also be included in the computing system 501. The bus 506 can communicatively couple one or more components of the computing system 501.

The computing system 501 executes program code that configures the processor 502 to perform one or more of the operations described above with respect to FIGS. 1-4. The program code includes operations related to, for example, one or more of the scenario selection engine 250, the user-specific execution engine 270, the initial schedule data 240, the user-specific process schedule data 225, or other suitable applications or memory structures that perform one or more operations described herein. The program code may be resident in the memory device 504 or any suitable computer-readable medium and may be executed by the processor 502 or any other suitable processor. In some embodiments, the program code described above, the scenario selection engine 250, the user-specific execution engine 270, the initial schedule data 240, and the user-specific process schedule data 225 are stored in the memory device 504, as depicted in FIG. 5. In additional or alternative embodiments, one or more of the scenario selection engine 250, the user-specific execution engine 270, the initial schedule data 240, the user-specific process schedule data 225, and the program code described above are stored in one or more memory devices accessible via a data network, such as a memory device accessible via a cloud service.

The computing system 501 depicted in FIG. 5 also includes at least one network interface 510. The network interface 510 includes any device or group of devices suitable for establishing a wired or wireless data connection to one or more data networks 512. Non-limiting examples of the network interface 510 include an Ethernet network adapter, a modem, and/or the like. A remote system 515 is connected to the computing system 501 via network 512, and the remote system 515 can perform some of the operations described herein, such as analyzing input data or initial schedule data or providing SME process resources. A supplementary resource computing system 580 is connected to the computing system 501 via network 512, and the supplementary resource computing system 580 can provide some of the resources described herein, such as providing one or more of the resource collections 235 or 135 or the supplementary resource computing systems 110. The computing system 501 is able to communicate with one or more of the remote computing system 515, the user computing device 290, and the supplementary resource computing system 580 using the network interface 510. Although FIG. 5 depicts the supplementary resource computing system 580 as being connected to computing system 501 via the networks 512, other embodiments are possible, including the supplementary resource computing system 580 running as a program in the memory 504 of computing system 501.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A system comprising:
a processor, and
a non-transitory computer-readable storage device storing instructions that are executable by the processor to:
implement a process analysis system including a scenario selection engine, a first instance of a user-specific execution engine, and a second instance of the user-specific execution engine;
receive first input data from a first additional computing system via the first instance of the user-specific execution engine and second input data from a second additional computing system via the second instance of the user-specific execution engine, wherein each of the first input data and the second input data identifies a particular subject-matter expert (SME) process;
extract, by the scenario selection engine from the first input data and the second input data, a set of process factors that describe the particular SME process, a first set of user factors, and a second set of user factors, wherein:
the first set of user factors describe a first user account implemented by the first additional computing system and associated with the first instance of the user-specific execution engine, and
the second set of user factors describe a second user account implemented by the second additional computing system and associated with the second instance of the user-specific execution engine;
determine, by the scenario selection engine based on the set of process factors, initial schedule data that describes a) event stages in the particular SME process and b) milestone stages in the particular SME process;
generate, by the scenario selection engine based on the first set of user factors, first user-specific process schedule data that includes a first modification of the initial schedule data, wherein the first modification comprises excluding at least one milestone stage described by the initial schedule data;
generate, by the scenario selection engine based on the second set of user factors, second user-specific process schedule data that includes a second modification of the initial schedule data, wherein the second modification comprises including an additional milestone stage in the milestone stages described by the initial schedule data, wherein the second modification is different from the first modification;
provide, from the scenario selection engine, the first user-specific process schedule data to the first additional computing system via the first instance of the user-specific execution engine and the second user-specific process schedule data to the second additional computing system via the second instance of the user-specific execution engine;
receive, by the scenario selection engine, first access request data from the first additional computing system via the first instance of the user-specific execution engine and second access request data from the second additional computing system via the second instance of the user-specific execution engine, wherein each of the first access request data and the second access request data requests to access a resource associated with a particular event stage included in i) the first user-specific process schedule data and ii) the second user-specific process schedule data;

permit access of the first additional computing system to the requested resource, based on a determination by the scenario selection engine that the particular event stage has a dependency on the at least one milestone stage excluded from the first user-specific process schedule data; and deny access of the second additional computing system to the requested resource, based on a determination by the scenario selection engine that the particular event stage has a dependency on the additional milestone stage included in the second user-specific process schedule data.

2. The system of claim 1, the instructions further executable to, subsequent to denying access of the second additional computing system to the requested resource:
identify one or more of a) the second user account associated with the second instance of the user-specific execution engine or b) an additional user account that is associated with the particular SME process;
generate alert data that describes the denied access of the second additional computing system to the requested resource; and
send the alert data to one or more of the second additional computing system implementing the second user account or another computing system implementing the additional user account.

3. The system of claim 1, the instructions further executable to, subsequent to denying access of the second additional computing system to the requested resource:
receive, from the second instance of the user-specific execution engine, progress data; and
responsive to determining that the progress data describes completion of the additional milestone stage, permit access of the second additional computing system to the requested resource.

4. The system of claim 1, wherein at least one of the first input data or the second input data identifying the particular SME process is natural-language data.

5. The system of claim 1, wherein at least one of the first set of user factors or the second set of user factors describes one or more of:
a data visualization preference indicated by the first user account or the second user account,
a level of information access indicated by the first user account or the second user account, or
a level of user experience with the particular SME process, for a respective user of the first user account or the second user account.

6. The system of claim 1, wherein the first additional computing system interacts with the first instance of the user-specific execution engine to provide the first input data identifying the particular SME process.

7. The system of claim 1, wherein the requested resource is associated with the particular SME process.

8. A method of controlling access to resources associated with subject-matter expert processes, the method including operations executed by a processor, the operations comprising:
receiving first input data from a first additional computing system and second input data from a second additional computing system, wherein each of the first input data and the second input data identifies a particular subject-matter expert (SME) process;
extracting, from the first input data and the second input data, a set of process factors that describe the particular SME process;
extracting, from the first input data, a first set of user factors that describe a first user account implemented by the first additional computing system;
extracting, from the second input data, a second set of user factors that describe a second user account implemented by the second additional computing system;
determining, based on the set of process factors, initial schedule data that describes a) event stages in the particular SME process and b) milestone stages in the particular SME process;
generating, based on the first set of user factors, first user-specific process schedule data that includes a first modification of the initial schedule data, wherein the first modification comprises excluding at least one milestone stage described by the initial schedule data;
generating, based on the second set of user factors, second user-specific process schedule data that includes a second modification of the initial schedule data, wherein the second modification comprises including an additional milestone stage in the milestone stages described by the initial schedule data, wherein the second modification is different from the first modification;
providing the first user-specific process schedule data including the first modification to the first additional computing system via a first instance of a user-specific execution engine, and the second user-specific process schedule data including the second modification to the second additional computing system via a second instance of the user-specific execution engine;
receiving first access request data from the first additional computing system and second access request data from the second additional computing system, wherein each of the first access request data and the second access request data requests to access a resource associated with a particular event stage included in i) the first user-specific process schedule data and ii) the second user-specific process schedule data;
based on a determination that the particular event stage has a dependency on the at least one milestone stage excluded from the first user-specific process schedule data, permitting access of the first additional computing system to the requested resource; and
based on a determination that the particular event stage has a dependency on the additional milestone stage included in the second user-specific process schedule data, denying access of the second additional computing system to the requested resource.

9. The method of claim 8, the operations further comprising, subsequent to denying access of the second additional computing system to the requested resource:
identifying one or more of a) the second user account implemented by the second additional computing system or b) an additional user account that is associated with the particular SME process;
generating alert data that describes the denied access of the second additional computing system to the requested resource; and
sending the alert data to one or more of a) the second additional computing system implementing the second user account or b) another computing system implementing the additional user account.

10. The method of claim 8, the operations further comprising, subsequent to denying access of the second additional computing system to the requested resource:

receiving, from the second additional computing system, progress data; and responsive to determining that the progress data describes completion of the additional milestone stage, permitting access of the second additional computing system to the requested resource.

11. The method of claim 8, wherein at least one of the first input data or the second input data identifying the particular SME process is natural-language data.

12. The method of claim 8, wherein at least one of the first set of user factors or the second set of user factors describes one or more of:

a data visualization preference indicated by the first user account or the second user account, a level of information access indicated by the first user account or the second user account, or a level of user experience with the particular SME process, for a respective user of the first user account or the second user account.

13. The method of claim 8, the operations further comprising:

generating recommendation data describing an efficiency improvement for the particular SME process; and providing the recommendation data to at least one of the first additional computing system or the second additional computing system.

14. The method of claim 8, the operations further comprising:

generating, based on the first set of user factors, first visualization data describing a visualization of a portion of the first user-specific process schedule data, wherein the visualization is adjusted based on a particular user factor in the first set of user factors; and providing the first visualization data to the first additional computing system.

15. A non-transitory computer-readable medium embodying program code for controlling access to resources associated with subject-matter expert processes, wherein, when executed by a processor, the program code causes the processor to perform operations comprising:

receiving first input data from a first additional computing system and second input data from a second additional computing system, wherein each of the first input data and the second input data identifies a particular subject-matter expert (SME) process;

extracting, from the first input data and the second input data, a set of process factors that describe the particular SME process;

extracting, from the first input data, a first set of user factors that describe a first user account implemented by the first additional computing system;

extracting, from the second input data, a second set of user factors that describe a second user account implemented by the second additional computing system;

determining, based on the set of process factors, initial schedule data that describes a) event stages in the particular SME process and b) milestone stages in the particular SME process;

generating, based on the first set of user factors, first user-specific process schedule data that includes a first modification of the initial schedule data, wherein the first modification comprises excluding at least one milestone stage described by the initial schedule data;

generating, based on the second set of user factors, second user-specific process schedule data that includes a second modification of the initial schedule data, wherein the second modification comprises including an additional milestone stage in the milestone stages described by the initial schedule data, wherein the second modification is different from the first modification;

providing the first user-specific process schedule data including the first modification to the first additional computing system via a first instance of a user-specific execution engine, and the second user-specific process schedule data including the second modification to the second additional computing system via a second instance of the user-specific execution engine;

receiving first access request data from the first additional computing system and second access request data from the second additional computing system, wherein each of the first access request data and the second access request data requests to access a resource associated with a particular event stage included in i) the first user-specific process schedule data and ii) the second user-specific process schedule data;

based on a determination that the particular event stage has a dependency on the at least one milestone stage excluded from the first user-specific process schedule data, permitting access of the first additional computing system to the requested resource; and based on a determination that the particular event stage has a dependency on the additional milestone stage included in the second user-specific process schedule data, denying access of the second additional computing system to the requested resource.

16. The non-transitory computer-readable medium of claim 15, the operations further comprising, subsequent to denying access of the second additional computing system to the requested resource:

identifying one or more of a) the second user account implemented by the second additional computing system or b) an additional user account that is associated with the particular SME process;

generating alert data that describes the denied access of the second additional computing system to the requested resource; and sending the alert data to one or more of a) the second additional computing system implementing the second user account or b) another computing system implementing the additional user account.

17. The non-transitory computer-readable medium of claim 15, the operations further comprising, subsequent to denying access of the second additional computing system to the requested resource:

receiving, from the second additional computing system, progress data; and responsive to determining that the progress data describes completion of the additional milestone stage, permitting access of the second additional computing system to the requested resource.

18. The non-transitory computer-readable medium of claim 15, wherein at least one of the first input data or the second input data identifying the particular SME process is natural-language data.

19. The non-transitory computer-readable medium of claim 15, wherein at least one of the first set of user factors or the second set of user factors describes one or more of:

a data visualization preference indicated by the first user account or the second user account, a level of information access indicated by the first user account or the second user account, or a level of user experience with the particular SME process, for a respective user of the first user account or the second user account.

20. The non-transitory computer-readable medium of claim 15, the operations further comprising:

generating recommendation data describing an efficiency improvement for the particular SME process; and providing the recommendation data to at least one of the first additional computing system or the second additional computing system.

* * * * *